United States Patent [19]

Yatsunami et al.

[11] Patent Number: 4,509,129
[45] Date of Patent: Apr. 2, 1985

[54] ELECTRONIC CALCULATING MACHINE WITH FACILITIES OF ANNOUNCING DATA INTRODUCED

[75] Inventors: Kenrow Yatsunami, Yamatokoriyama; Yoshihiki Iwamoto, Sakurai, both of Japan

[73] Assignee: Sharp Kabushiki Kaisha, Osaka, Japan

[21] Appl. No.: 625,003

[22] Filed: Jun. 26, 1984

Related U.S. Application Data

[63] Continuation of Ser. No. 85,302, Oct. 16, 1979.

[30] Foreign Application Priority Data

Oct. 16, 1978 [JP] Japan ................................. 53-128803

[51] Int. Cl.³ ......................... G10L 1/00; G06F 15/02
[52] U.S. Cl. ................................... 364/513.5; 381/51; 364/405

[58] Field of Search .................................. 381/51–53; 84/1.01; 364/513, 513.5, 514, 405; 235/383

[56] References Cited

U.S. PATENT DOCUMENTS 4,060,848 11/1977 Hyatt .................................. 364/405
4,139,149 2/1979 Crepeau et al. ..................... 235/383

FOREIGN PATENT DOCUMENTS 1202391 8/1970 United Kingdom .

*Primary Examiner*—E. S. Matt Kemeny
*Attorney, Agent, or Firm*—Birch, Stewart, Kolasch & Birch

[57] ABSTRACT

A point of sale cash register which displays the price of an item as read by a bar code reader, also announces in simplified form a sound representing the price-range of the item such that an error so detected by the operator may be corrected by keyboard.

3 Claims, 1 Drawing Figure

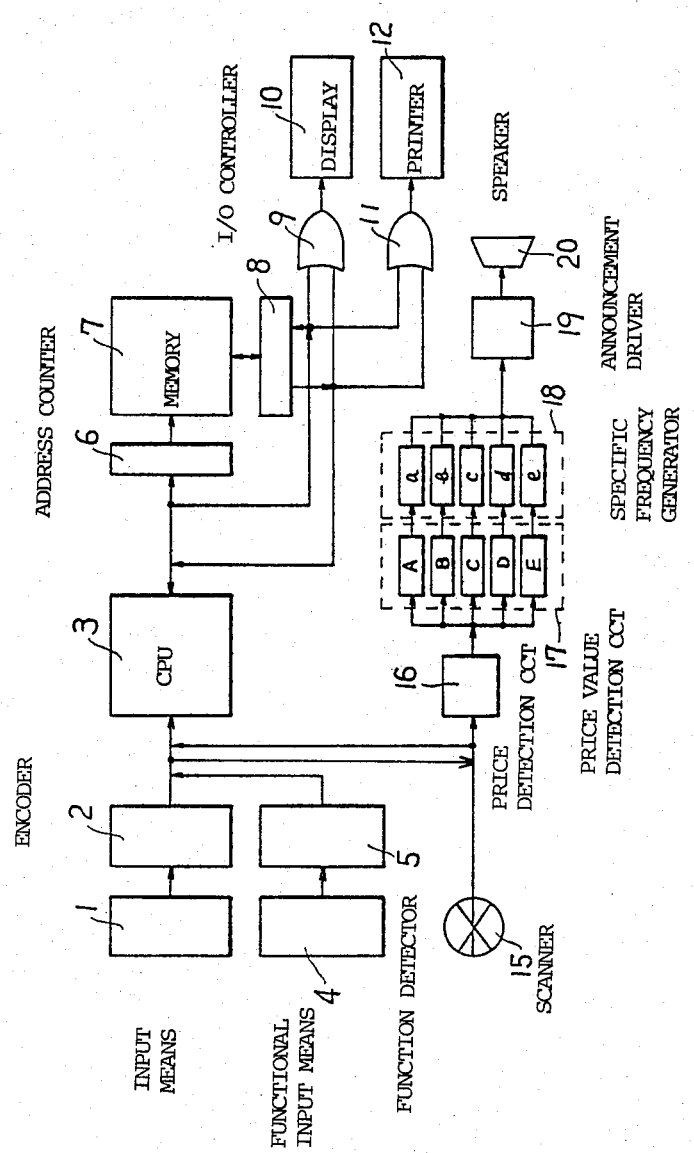

ELECTRONIC CALCULATING MACHINE WITH FACILITIES OF ANNOUNCING DATA INTRODUCED

This application is a continuation of copending application Ser. No. 85,302, filed on Oct. 16, 1979.

BACKGROUND OF THE INVENTION

The present invention relates to an electronic calculating machine, and more particularly to an electronic cash register for announcing in an audible form information concerning merchandise, thereby reducing the possibility of errors in introducing merchandise information.

A conventional electronic cash register was adapted to announce an actuation of anyone of a plurality of keys switches to uniform control circuitry of data entry therein. It was impossible to determine whether the data introduced such as cost information was correct.

However, it was possible for the operator to determine whether the data entered was correct by referring to the data indicated on a display of the cash register. In other words, a receipt or a journal printed was of use to the determination as to data entry.

But if the operator failed to refer to the display, the receipt, or the journal, no identification was derived.

Recently, bar code readers with a reading scanning have been incorporated into cash registers.

In such a cash register with a self contained bar code reader, it is still greatly desired that data actually introduced be verified with respect to data to be entered without relying upon any display, receipt or journal.

SUMMARY OF THE INVENTION

Accordingly, it is the primary object of the present invention to provide an improved calculating machine for announcing information indicative of data introduced.

It is a further object of the present invention to provide an improved calculating machine for announcing in an audible form price information relevant to the merchandise information introduced.

If is a further object of the present invention to provide an improved electronic cash register for generating sound information indicative of the price of the merchandise in question according to a classification table of prices.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic cash register comprises an input device for entering information related to a specific article for registration purposes, a detection device for detecting the entered information, and a generating device for generating sound information in connection with the entered information. A bar code reader for reading bar code information recorded in connection with the particular article may also be used as an alternative input device.

In particular, the entered information is related to price information, while the sound information is preferably concerned with a value defined by the price information. The sound information may be alarm information, audio information, or voice information.

A specific sound generator is contained within the generating device. The specific sound generator comprises a specific frequency generator to provide alarm information. Otherwise, it contains a tape reproduction device to provide the audio information. Further, it may include a voice synthesizer for providing predetermined voice information.

BRIEF DESCRIPTION OF THE DRAWINGS

The present invention will become more fully understood from the detailed description given hereinbelow and accompanying drawings which are given by way of illustration only, and thus are not limitative of the present invention and wherein:

The single FIGURE of the drawings is a block diagram of a control circuit incorporated into an electronic calculating machine such as an electronic cash register according to the present invention.

DESCRIPTION OF THE INVENTION

Referring to the single FIGURE, a control circuit of an electronic calculating machine or cash register according to the present invention comprises an input means 1, an encoder 2, a central processing unit (CPU) 3, a functional input means 4, a function detector 5, an address 6, a memory 7, an I/O controller 8, an OR gate 9, a display 10, another OR gate 11, a printer 12, and a scanner 15.

To provide sound information corresponding to merchandise in particular, price information or the like, the control circuit further contains a price detection circuit 16, a price value detection circuit 17, a specific frequency generator 18, an announcement driver 19, and a speaker 20 according to the preferred embodiment. In this instance, the sound information is generated from the control circuit to inform a user of classification of the price for identification. Rather than the classification in the price value, other sound information can be helpful to provide identification between merchandise information to be entered and actually-introduced merchandise information. For example, classification of the merchandise itself can be audibly displayed for identification.

Turning back to the drawings, the control circuit operates as follows.

The input means 1 contains a plurality of key switches operable for entering a specific price of a particular article. Price information is admitted to the CPU 3 after being encoded by the encocer 2. Subsequently, at least one of a plurality of key switches provided within the functional input means 4 is actuated to indicate what kind of the article is involved in the transaction. The function detector 5 is employed to pick up classification signals from the functional input means 4. Then the price information enters the CPU 3 in conjunction of the classification signals.

Under the control of the I/O controller 8, the price information and the classification signals are transferred from the CPU 3 to their appropriate addresses of the memory 7 which are specified by the address counter 6. Thus the price information and the classification signals are stored in the memory 7. On the other hand, the price information and the classification signals are indicated in the display 10 through the OR gate 9. Further, they are printed out by means of the printer 12 on a receipt and a journal.

After the entry operation has been accomplished, a total key or the like contained within the functional input means 4 is actuated to indicate the termination of data entry. Termination information is admitted to the CPU 3 through the function detector 5 so that respective ones of price information stored in the memory 7 are adequately calculated and the results are restored in particular addresses of the memory 7. The results are also indicated in the display 10 and are registered in the receipt and the journal.

Instead of the input means 1 and the function input means 4, the scanner 15 is energized by selection to optically read bar code information recorded in connection with a particular article. The bar code information is related to the price information and the classification information for the particular article. These two kinds of the information detected by the scanner 15 are entered into the CPU 3 so that they are stored in the memory 7 in a similar manner as described above. The information is indicated in the display 10 through the OR gate 9 and is also printed out on the receipt or the journal with the printer 12 through the OR gate 11.

The price information entered by either the input means 1 or the scanner 15 is selected by the price detection circuit 16 apart from the classification information. The price information is applied to the price value detection circuit 17 so that it is classified into one of A to E groups according to the magnitude of the value of the price information. For example, the five groups are defined as follows: A group covers values less than or equal to 200 yen; B group relates to values in the range of 201 to 400 yen; C group in the range of 401 to 600 yen; D group in the range of 601 to 800; and E group more than or equal to 801.

The respective A to E groups are related to five sections A to E contained within the price value detection circuit 17. When each of the five groups is specified, the corresponding one section among the five sections is activated. Each of the five sections included within the price value detection circuit 17 activates the corresponding one of five sections a to e of the specific frequency generator 18.

Output signals from each of five sections a to e of the specific frequency generator 18 are applied to the announcement driver 19 so that they are audibly generated from the speaker 20. Since the output signals from each of the five sections a and e are different from each other, the operator can determine the magnitude of the value defined by the price information in the form of sound information.

According to an example of the present invention, the accuracy of the introduced price information is assured with reference to the sound information for the magnitude of the value corresponding to the price information.

If the inaccuracy of the introduced price information is detected with the help of the sound information, the operator actuates a correction key disposed within the functional input means 4. Information from the functional input 4 necessary to perform the required correction is admitted to the CPU 3 through the function detector 5.

If the scanner 15 is energized to read the bar code information, the specific article in connection with the inaccurate price information is repeatedly disposed on the scanner 15 to read the incorrect bar code information. The repeatedly-read incorrect bar code information is utilized to cancel the incorrect bar code information stored in the memory 7.

On the other hand, if the input means 1 and the functional input means 4 are enabled to apply the price information and the classification information, respectively, the inaccurate price and classification information is again entered with reference to the contents of the display 10 and the receipt or journal. The preceding incorrect information is eliminated from the memory 7 with the aid of the following incorrect information.

The CPU 3 controls cancel operations for the incorrect information stored in the memory 7. There is printed out on the receipt or journal by means of the printer 12 information representing that the preceding information is incorrect.

Subsequently, correct price and classification information is entered by either the scanner 15 or the input means 1 and the functional input means 4.

It is advantageous that an amount of the value specified by each of the five sections within the price value detection circuit 17 be freely present to enhance the above mentioned confirmation operations.

In another preferred embodiment of the present invention, it is possible that the five sections a to e of the specific frequency generator 18 contain, respectively, means for generating voice information which is preliminarily recorded in a tape or the like.

In a further form of the present invention, the introduced price information can be generated in the form of voice information by means of the well-known voice synthesizer, where the value defined by the price information is delivered as such. Needless to say, voice representing the classification of the value as described above can be also generated in terms of the voice synthesizer. Since such a voice synthesizer is described in detail in U.S. Pat. No. 4,060,848 granted to G. P. Hyatt on Nov. 29, 1977, entitled ELECTRONIC CALCULATOR SYSTEM HAVING AUDIO MESSAGES FOR OPERATOR INTERACTION, a further description thereof is omitted.

While only certain embodiments of the present invention have been described, it will be apparent to those skilled in the art that various changes and modifications may be made therein without departing from the spirit and scope of the invention as claimed.

What is claimed is:

1. An electronic cash register comprising:
input means for entering product code information related to a product to be sold, said input means including a bar code reader for reading bar code information in connection with the specific article, a plurality of input keys for entering a specific price of the article, and function key for entering the type of article involved in a transaction;
price determination means responsive to said input means for determining the price of said product from its related produce code information;
classification means responsive to said price determination means for generating a price range signal representative of one of a plurality of price ranges, said price range signal generated being representative of a code which in simplified manner represents the price range in which the price of said product is included;
audible frequency generator means for producing an audio frequency signal from said price range signal, said audio frequency signal being representative of the price range in which the price of said product is included;

sound generator means responsive to said audible frequency generator means for generating an audible indication of the price range in which the price of said product is included, an operator thereby determining if a price determined by said price determination means is erroneous in magnitude; and operator actuatable means operatively connected to said price determination means for correcting said determined price when said price range is determined by the operator to be erroneous from said audible indication.

2. The electronic cash register of claim 1 wherein said sound generator is a voice synthesizer and wherein said audible indication is simulated voice information.

3. The electronic cash register of claim 1 wherein said audible indication is one of a plurality of preselected musical tones.

* * * * *